United States Patent [19]

Durand

[11] 4,073,959

[45] Feb. 14, 1978

[54] GUM CONFECTIONS CONTAINING POTATO STARCH

[75] Inventor: Harry Walter Durand, Muscatine, Iowa

[73] Assignee: Grain Processing Corporation, Muscatine, Iowa

[21] Appl. No.: 744,501

[22] Filed: Nov. 24, 1976

Related U.S. Application Data

[63] Continuation-in-part of Ser. No. 639,381, Dec. 10, 1975, abandoned.

[51] Int. Cl.² ............................................. A23G 3/00
[52] U.S. Cl. .................................... 426/578; 426/662
[58] Field of Search ........................................ 426/578

[56] References Cited

U.S. PATENT DOCUMENTS

| 2,193,470 | 3/1940 | Bergquist | 426/578 |
| 3,097,951 | 7/1963 | Greninger | 426/578 |
| 3,446,628 | 5/1969 | Schoch | 426/578 |

*Primary Examiner*—Jeanette M. Hunter
*Attorney, Agent, or Firm*—Neuman, Williams, Anderson & Olson

[57] ABSTRACT

A quick-gelling gum confection containing potato starch having a Buel fluidity of about 20–70 as the gelling agent.

2 Claims, No Drawings

GUM CONFECTIONS CONTAINING POTATO STARCH

This application is a continuation-in-part of my previous application, Ser. No. 639,381 filed Dec. 10, 1975, now abandoned.

This invention relates to improvements in making gelled confections which utilize the setting properties of starches.

Various gelled confections take advantage of the ability of starch to form a gel in a system containing sucrose and corn syrup in addition to the starch. Exemplary of such confections are gum-centered candies, gum slices, gumdrops, jelly beans and the like. In making such gum confections it has been conventional practice to use an acid-modified, thin-boiling starch generally derived from corn or wheat. The earlier prior art batch type procedures were very time-consuming and required a rather long boiling time in order to evaporate sufficient water so that the mixture could be poured into the forms in the molding tray where, after holding for a period of one to several days, the confection was ready for panning or sanding. More recently, the proper amounts of water, sugar, syrup and starch have been cooked under pressure by steam injection or with a heat exchanger to reduce the cooking time and to enable the process to operate on a continuous basis.

Regardless of the cooking method, the subsequent molding procedures usually still involve holding the cooked syrup mix in the molds for more than a day to obtain proper drying and gel formation. U.S. Pat. No. 3,446,628 discloses known procedures for making gel confections in which starch is used as a congealing agent. The patent suggests that the molding time can be decreased by the use of thin-boiling cereal starches which have been solvent extracted to reduce the content of fat below about 0.3% on a dry starch basis. The patent teaches that both potato and tapioca starches, both of which are root starches, cannot be used in the production of quick-setting gum confections, even though they are low in fat and contain the proper amount of amylose.

In accord with this teaching, it has been found that indeed tapioca starch, whether or not it has been acid modified, cannot be used in the production of quick-setting gum confections. However, contrary to the same teachings, it has now been found that potato starch can be used advantageously to produce gum confections that require use of a quick gelling starch as the congealing agent provided that it has been modified to give a Buel fluidity of about 20 to 70. Buel fluidity is defined by the method and scale as described by H. Buel, Intern. Congr. Applied Chem. 9th Congr., Washington and New York, Original Communication, 13, 63 (1912) and by Kerr, R. W., "Chemistry and Industry of Starch", Academic Press, New York, 133 (1950).

The paste viscosity of potato starch can be reduced to the desired fluidity level by treating with acid as is well known in the art. The potato starches having a fluidity as specified herein can be used in lieu of other starches and in similar known manner for the preparation of gelled or gummed confections which develop a satisfactory firm gel structure in a period of not substantially more than two hours. As well known in the art, a satisfactory firm gel structure has been attained when the gum confection can be unmolded and sugared or sanded without deformation due to excessive plastic flow. The quick setting property exhibited by the potato starch permits the gum confections to be produced in continuous manner as discussed, for example, in U.S. Pat. No. 3,446,628.

EXAMPLES

Potato starches having a fat content less than 0.1% based on dry weight were subjected to acid modification by conventional acid-modification procedures to achieve starches having various Buel fluidities. After treatment with acid, the starches were neutralized, filtered, washed and dried.

The acid-modified potato starches together with the unmodified potato starch control were used in the following gum confection formulation:

| | |
|---|---|
| Starch (dry basis) | 1 pound |
| Corn syrup* | 4 pounds, 9 ounces |
| Sucrose | 3 pounds |
| Water | 1 pound, 4 ounces |

*The corn syrup was one of 43° Be, analyzing 63 dextrose equivalent (D.E.) and approximately 81.6% dry solids.

The gum confection formulations were preheated to a temperature of about 222° F. and pumped through a steam injection cooker under internal temperatures ranging from about 250° F. to about 290° F. with the cooking times in the cooker ranging from 25 seconds to 70 seconds. Immediately after cooking, the hot mixtures were formed into gumdrops by spooning into starch molds and held at room temperature.

The candies were observed and periodically removed from the molds and the quick-set value of each was judged on the basis of the gum's ability to achieve sufficient firmness after two hours to permit sanding, i.e., coating with crystalline sugar. The results are summarized below:

Table 1

| Example | Starch | Degree of Acid Modification, Buel Fluidity | Cook Conditions Time (sec.) | Cook Conditions Temp. (° F.) | Degree of Set After Two Hours | Comments |
|---|---|---|---|---|---|---|
| 1 | Potato | Unmodified | 75 | 278 | Not Measured | Too Thick For Deposit |
| 2 | " | 5 | 60 | 273 | Not Measured | Too Thick For Deposit |
| 3* | " | 10 | 50 | 275 | Not Measured | Too Thick For Deposit |
| 4 | " | 10 | 38 | 280 | Not Measured | Too Thick For Deposit |
| 5* | " | 20 | 40 | 275 | Fair | |
|  | " | 20 | 32 | 276 | None | Apparently Incomplete Dispersibility |
| 6 | " | 30 | 40 | 275 | Good | |
| 7 | " | 30 | 29 | 255 | Good | |
| 8 | " | 30-35 | 45 | 278 | Good | |
| 9 | " | 40 | 38 | 275 | Good | |
| 10 | " | 45 | 40 | 275 | Good | |
| 11 | " | 50 | 45 | 278 | Good | |
| 12* | " | 50 | 32 | 275 | Very Good | |
| 13 | " | 50-55 | 34 | 278 | Good | |

Table 1-continued

| Example | Starch | Degree of Acid Modification, Buel Fluidity | Cook Conditions Time (sec.) | Cook Conditions Temp. (° F.) | Degree of Set After Two Hours | Comments |
| --- | --- | --- | --- | --- | --- | --- |
| 14 | " | 55-60 | 40 | 275 | Good | |
| 15 | " | 60 | 40 | 278 | Good | |
| 16 | " | 60 | 37 | 275 | Fair-Good | |
| 17* | " | 60 | 34 | 275 | Good | |
| 18 | " | 60-65 | 34 | 275 | Good | |
| 19 | " | 70 | 70 | 285 | Good | |
| 20 | " | 70 | 25 | 290 | Weak | |
| 21 | " | 75 | 40 | 275 | Weak | |
| 22 | " | 75-80 | 32 | 265 | None | |
| 23 | " | 80 | 40 | 275 | Poor | |

*Acid-modified starches marked (*) were dried using freeze-drying procedure, otherwise by oven-drying at 120-130° F.

The invention makes possible for the preparation of gum confections the use of a starch source heretofore believed not usable for the purpose. The potato starches need not be subjected to solvent defatting procedures as suggested in United States patent No. 3,446,628.

Those modifications and equivalents which fall within the spirit of the invention are to be considered a part thereof.

What is claimed is:

1. In a continuous process for making a quick setting gum confection containing a starch gelling agent wherein the gum confection gels in a period of not substantially more than 2 hours, the improvement which consists in employing as the starch gelling agent potato starch having a Buel fluidity of about 20 to 70.

2. A quick setting gum confection which gels in a period of not substantially more than about 2 hours containing potato starch having a Buel fluidity of about 20 to 70 as the gelling agent.